May 15, 1928.

J. W. BRYCE 1,669,853

SCALE

Filed Feb. 11, 1922  6 Sheets-Sheet 1

Inventor
James W Bryce
By his Attorneys
Cooper Kerr & Dunham

May 15, 1928.

J. W. BRYCE 1,669,853

SCALE

Filed Feb. 11, 1922

Inventor
James W. Bryce
By his Attorneys
Cooper Kerr & Dunham

May 15, 1928.  J. W. BRYCE  1,669,853
SCALE
Filed Feb. 11, 1922   6 Sheets-Sheet 3

INVENTOR
James W Bryce
BY Cooper Kerr & Dunham
ATTORNEY

May 15, 1928.

J. W. BRYCE 1,669,853

SCALE

Filed Feb. 11, 1922   6 Sheets-Sheet 5

May 15, 1928.
J. W. BRYCE
SCALE
Filed Feb. 11, 1922   6 Sheets-Sheet 6
1,669,853
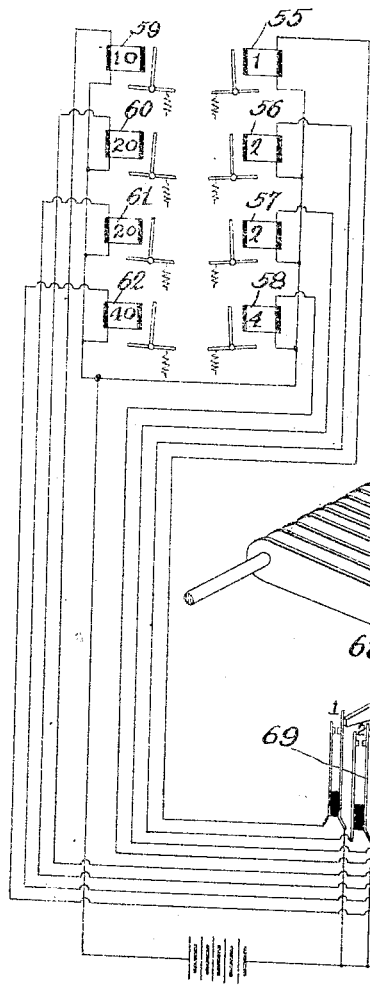
Fig. 10.
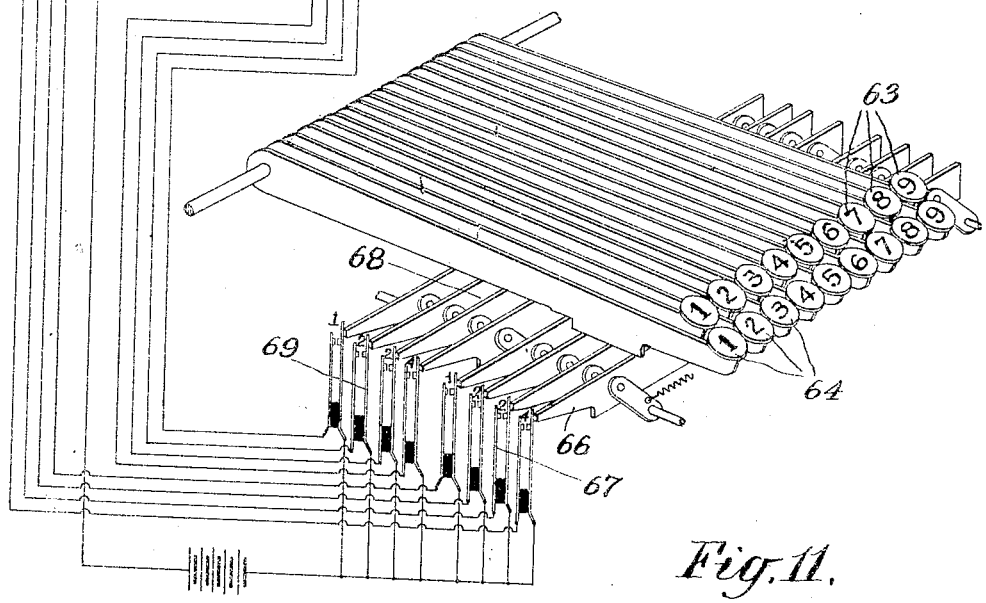
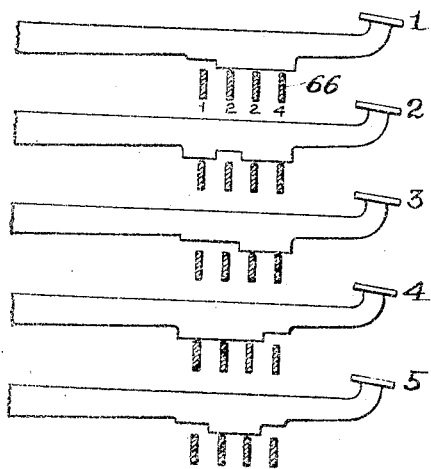
Fig. 11.
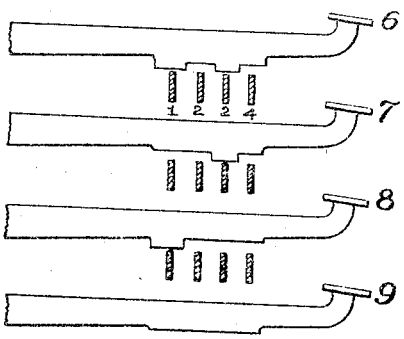
INVENTOR.
James W Bryce
BY Cooper Kerr & Dunham
ATTORNEYS.

Patented May 15, 1928.

1,669,853

UNITED STATES PATENT OFFICE.

JAMES W. BRYCE, OF BINGHAMTON, NEW YORK, ASSIGNOR, BY MESNE ASSIGNMENTS, TO DAYTON SCALE COMPANY, OF DAYTON, OHIO, A CORPORATION OF NEW JERSEY.

SCALE.

Application filed February 11, 1922. Serial No. 535,727.

Heretofore I have devised weighing scales in which load offsetting devices are employed in connection with a main scale beam whereby the main scale beam is not subject to variable displacements under varying loads.

In one embodiment, as shown in my application, Serial No. 468,836, filed May 12, 1921, I have shown and described a novel form of weighing machine which provides for the offsetting of loads by means of applied weights which are automatically applied and removed from a scale beam. Suitable devices are provided for factoring the weights to permit the use of a comparatively small number of them to offset applied loads of comparatively large ranges.

In my prior Patent No. 1,392,908 I have shown, described and claimed a construction in which the load is offset by a yielding means which is distended by an independent source of power and in which the distention of the yielding means is automatically commenced and interrupted when the load is applied and when the beam is in balance. In both of these constructions there is the feature that the beam is of the even balance or so-called static type and therefore indication of the applied load does not depend upon a variable displacement factor and in consequence thereof such scales are not subject to the errors of variable displacement scales.

In the present invention use is made of the above types of weighing machines or more particularly to the load offsetting devices therein provided and there is associated therewith certain beam or lever ratio changing devices to provide a price scale which will indicate, set up on numeral wheels, or otherwise display the product of the price per unit of weight and the applied load.

Heretofore price scales have been proposed and built with multiple and variable ratio beams which were displaceable in different ways to secure various prices and products. Such devices, as heretofore proposed, have generally been uncommercial and impractical since, when in use, they became subject to errors which rapidly caused the same to become so inaccurate as to be substantially worthless. These errors have been due largely to the variable friction caused by the variable displacement of the parts or the errors have been due to wear and lost motion at adjustable fulcrum points. In many of these devices attempts have been made to vary the fulcrum along the beam. Such constructions in particular have been hard to make and when in use it has been extremely difficult to exactly adjust the pivot positions to obtain the desired multiplication ratios.

In the present embodiment the ratio devices are static in their nature. They are not variably displaced in accordance with varying loads and in consequence are adapted to carry out their underlying and essential functions without introducing the objectionable errors heretofore encountered in devices of this sort. In the present embodiment the adjustment of the pivot points is effected in such a manner that the manufacturing of the parts themselves is comparatively simple and when in use these parts do not introduce errors due to wear and lost motion.

According to the present embodiment I provide a non-displaceable load offsetting mechanism, a load support, a variable ratio beam structure intermediate the load offsetting mechanism and the load support, and selecting devices for selecting the ratio of the beam structure in accordance with the desired price per unit of weight. With this construction measurements are made solely of pressure or reacting force and the displacement of the parts per, se is not measured.

A clear understanding of the machine will be obtained from the following illustrations. Suppose the load offsetting devices react upon the lever system with the force of one unit and indicate one unit and that the leverage ratio be one to one with an applied load of one pound, one would be indicated. Let it be assumed that the price be one cent per pound. Then one cent would be indicated on the dial or wheel. Now assume that the price of the article be ten cents per pound the ratio of the leverage device would be changed to a one to ten basis. Then with one pound on the load support, ten cents or the total price thereof would be displayed.

By providing a lever system embodying a plurality of levers and a plurality of pivot points therefor, which are individually at fixed distances relatively to the other pivots on the said levers and selectively shiftable with respect to bearing devices which are connected to the load offsetting means, in factored combinations, it is possible to obtain large numbers of lever ratios without introducing errors. Errors in results are obviated with devices of this sort, since, when in use, pressures alone are measured and variable displacement of parts is eliminated.

Further objects of the present invention reside in the provision of a multiple ratio device which is adapted for use in various mechanisms in which a plurality or a large multiple of ratios are desired to be obtained intermediate one mechanism and another. Among the uses of such a device there may be mentioned price scales and counting scales which include a force measuring apparatus. In both of these devices it is desired to multiply one unit by another quantity, which latter quantity is a widely variable one. In my novel multiple ratio device I provide means for selectively utilizing a number of devices, preferably levers, for conjoint operation to secure a desired ratio and to give a unitary result and these devices operate in cooperation with another group of devices which by their conjoint and selective operation give another ratio which results in a unitary result. Means are provided for combining the unitary results thus secured and for displaying a number representative of the combined result.

My novel multiple ratio mechanism is not limited in its use or application to price or counting scales but also may be used in a wide variety of devices in which it is desired to select and combine large numbers of leverage ratios to give a great number of multiple ratios in the mechanism.

In the drawings,

Fig. 10 is a diagrammatic view of the selecting device for selecting the factor combinations of the desired pivot points.

Fig. 11 shows details of the individual price keys and their configuration with respect to the factoring contact controlling bars.

Figure 1:
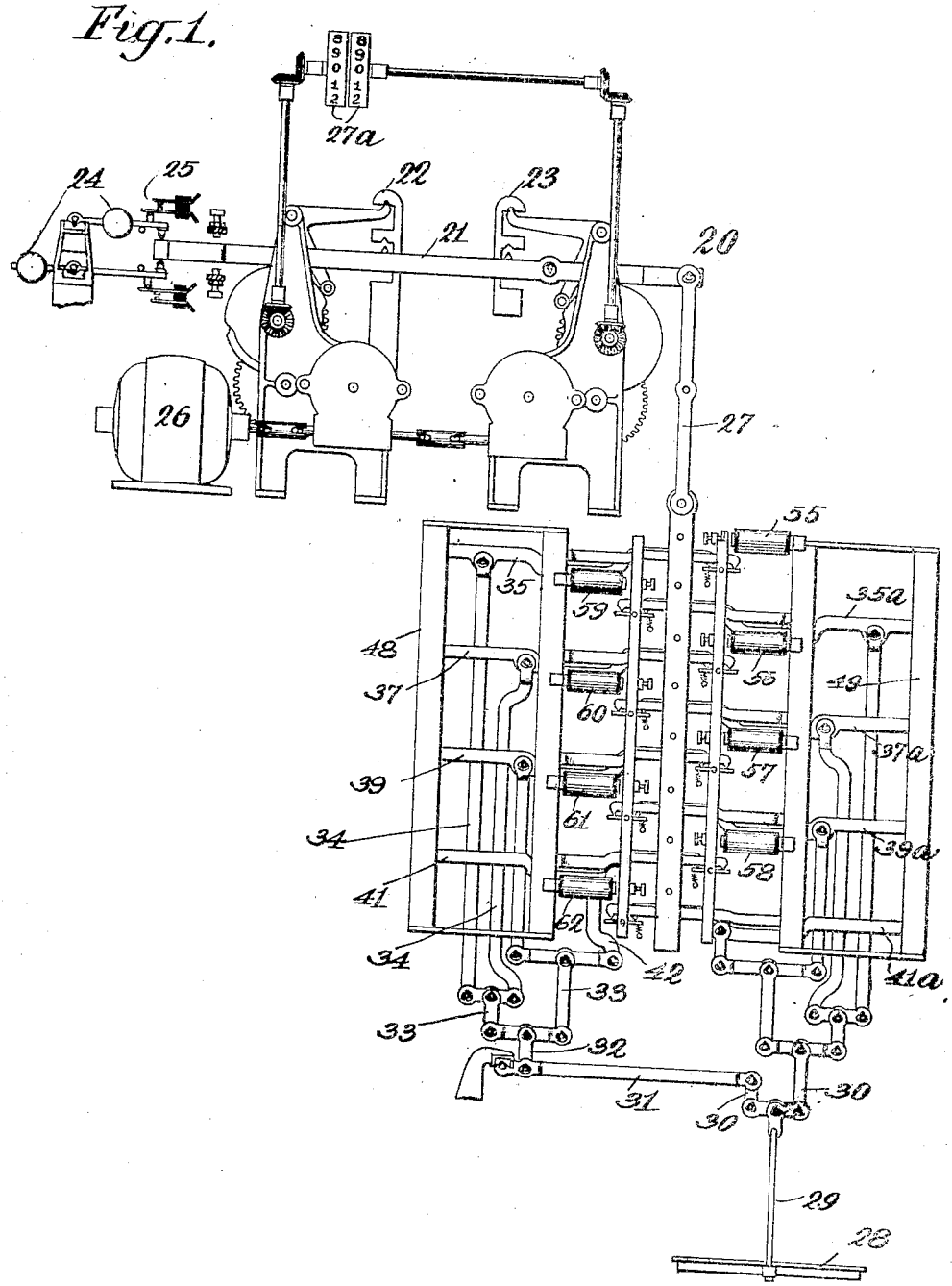
Figure 1 is a view showing in elevation, a scale made in accordance with my invention.

In more detail in the drawings, 20 illustrates a load offsetting mechanism which is of the general type described in my application heretofore referred to. This load offsetting mechanism comprises a fulcrumed beam 21, weights 22, 23, pilot weight device 24, pilot weight contacts 25 and motor 26. By suitable pilot devices, motor 26 is set into rotation and by means of certain selecting cams applies factored combinations of the weights 22 and 23 to the beam 21 to offset the applied load. Motor 26 also sets up numeral wheels 27ª to display or otherwise show a number which corresponds with the offset load. Depending from the beam 21 is a steelyard 27 which through the variable lever ratio mechanism ultimately connects the beam 21 to the load support or platform 28. This load support for simplicity of illustration is herein shown as a depending pan or platform 28. It will be understood that various other types of load supports may be used such as, for example, the ordinary floor platform which would be provided with the usual base lever system and connected by the suitable steelyard 29 with the variable ratio leverage device.

For simplicity in following the description of the principle of my invention, I have disclosed a variable leverage ratio mechanism which is capable of transmitting a force of forty units effective on the load support 28 so as to create a force of from one to ninety-nine units inclusive on the load off-setting mechanism 20. Accordingly, it will be assumed that there is effective on the platform or load support 28, a load of forty units. It will be understood that the weight of the platform and the dead weight of the parts is balanced out in the usual manner.

Figure 9:
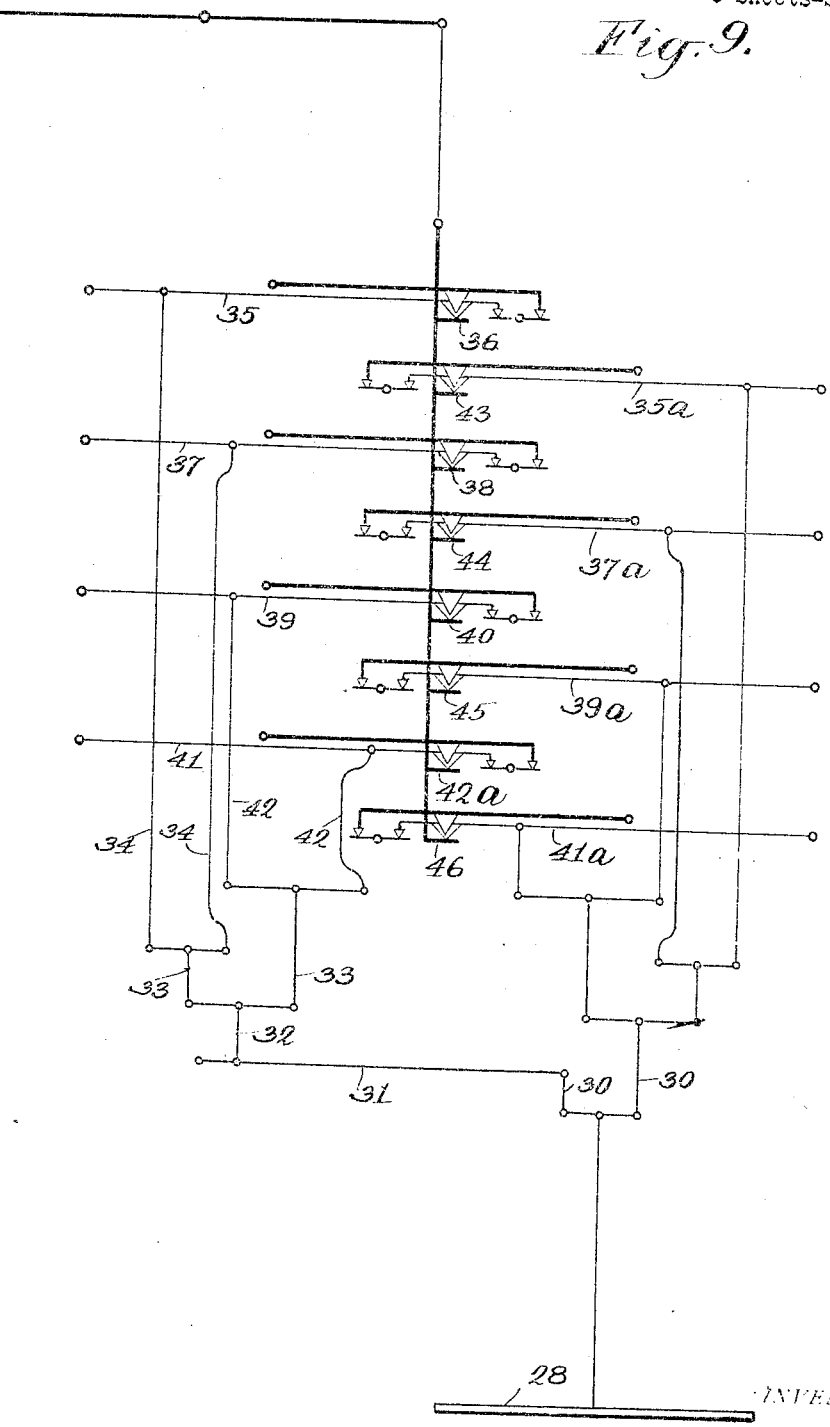
Fig. 9 is a diagrammatic view of the variable leverage system and shows thereon the various leverage ratio combinations which are obtained.

Referring now to diagrammatic Fig. 9, with an assumed load of forty units on platform 28, there will be a force of twenty units transmitted to each link 30. Lever 31 having a 10 to 1 ratio will transmit through link 32 two hundred units of force. Links 33 will transmit one hundred units of force each. Links 34 will transmit fifty units of force each. Lever 35 having a 5 to 1 ratio will transmit to its pivot point 36 ten units of force. Lever 37 having a 5 to 2 ratio will transmit to its pivot 38 twenty units of force. Similarly, lever 39 having a 5 to 2 ratio will transmit to its pivot 40 twenty units of force. This lever 39 and lever 41 receive forces through links 42 which transmit to their respective levers fifty units of force. Lever 41 has a 1¼ to 1 ratio. Consequently, the pivot point 42ª of lever 41 will receive forty units of force. Essentially the same arrangement of multiple lever systems is employed for the right hand parts and these transmit forces to their respective pivot points which are $\frac{1}{10}$ times the value of the corresponding forces applied by left hand levers, i. e., on pivot point 43 there will be one unit of force applied by lever 35$^a$, on pivot point 44 there will be two units of force applied by lever 37$^a$, on pivot point 45 there will be two units of force applied by lever 39$^a$ and on pivot point 46 there will be four units of force applied by lever 41$^a$.

Figure 2:
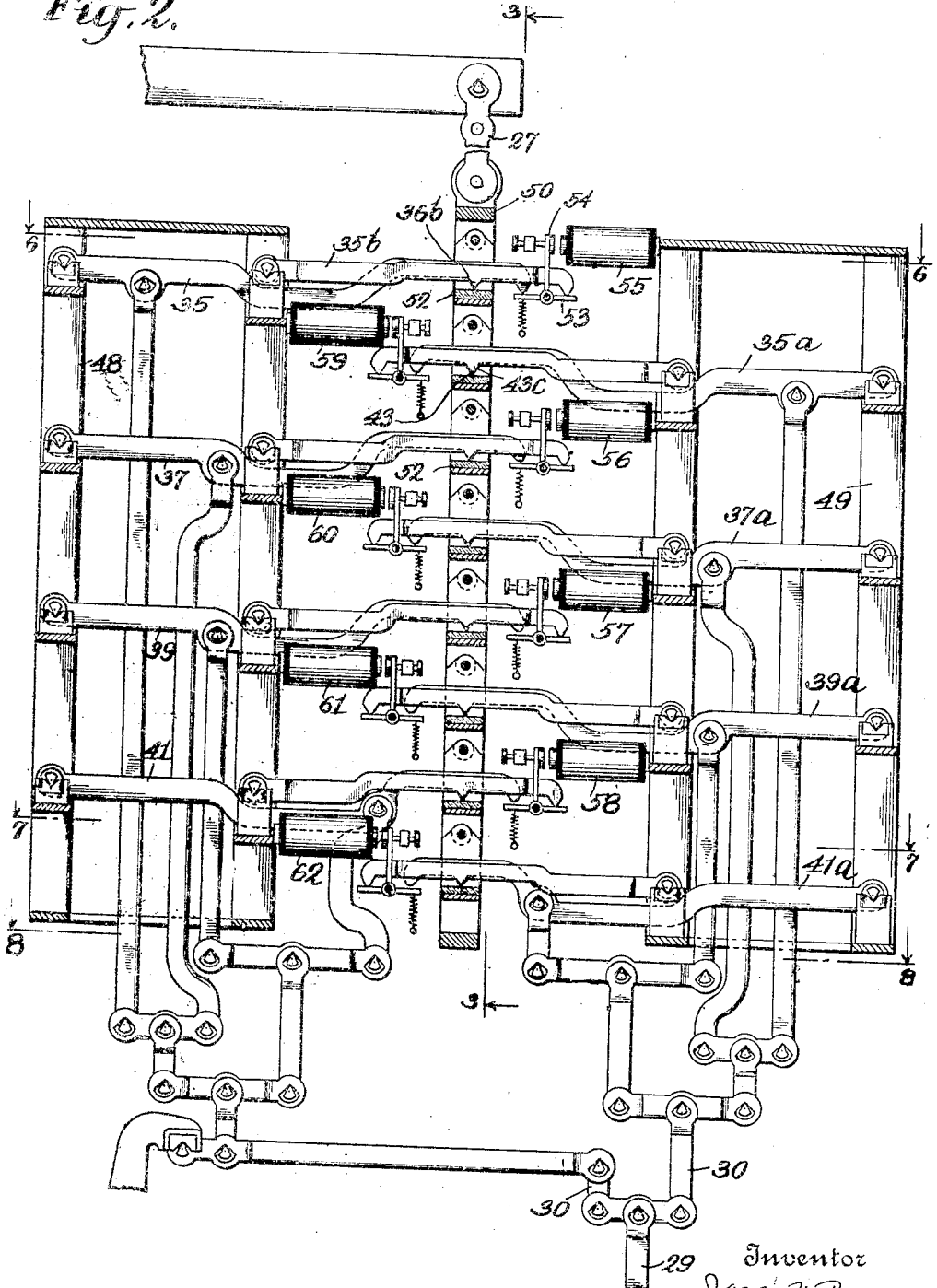
Fig. 2 is a detailed enlarged view of the leverage ratio devices shown in Fig. 1.
Figure 3:
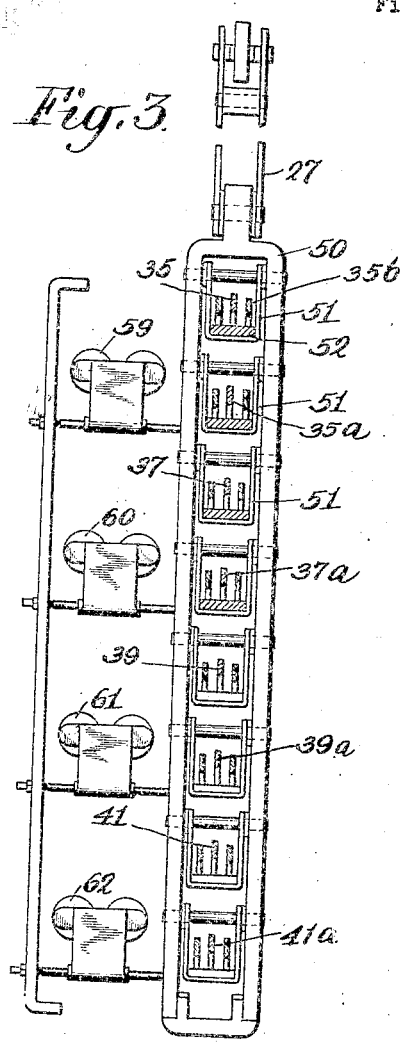
Fig. 3 is a sectional view of the parts show in Fig. 2, the section being taken on line 3—3.
Figure 4:
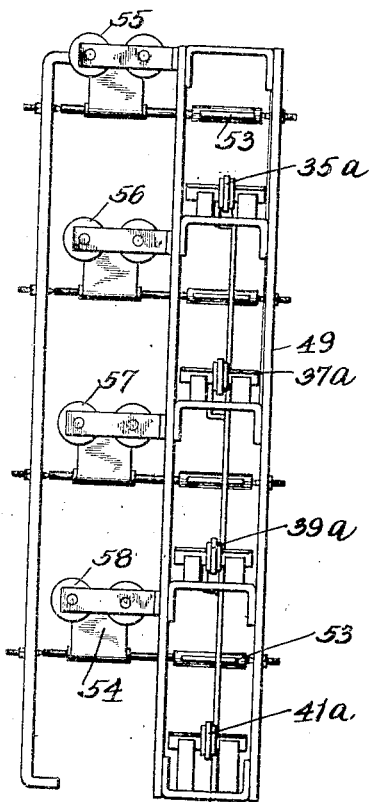
Fig. 4 is an end elevation of the parts shown in Fig. 2 looking from the right.
Figure 5:
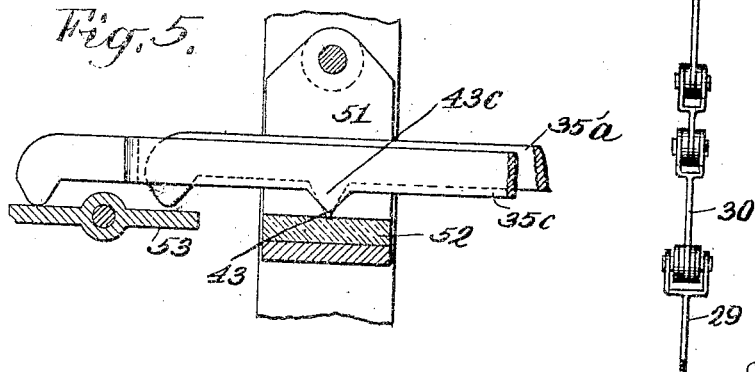
Fig. 5 is an enlarged detail of the pivot selecting and adjusting devices.
Figure 6:
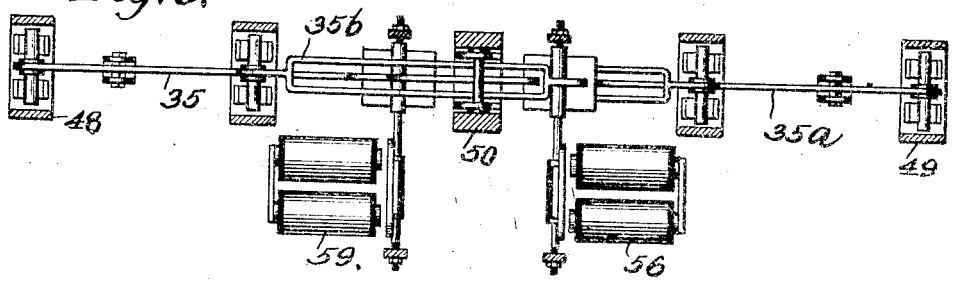
Fig. 6 is a detail sectional view taken on line 6—6 of Fig. 2.
Figure 7:
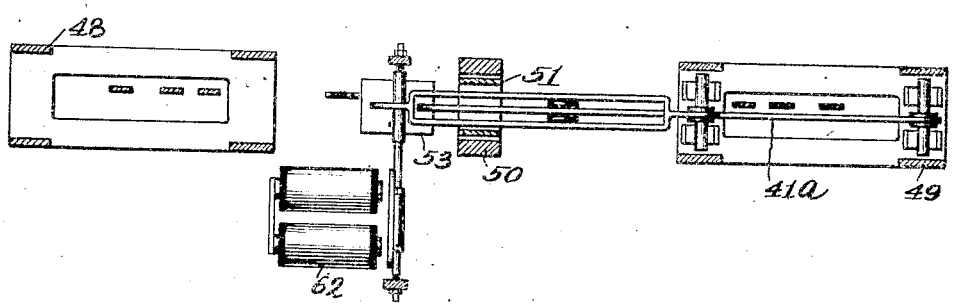
Fig. 7 is a similar detail sectional view taken on line 7—7 of Fig. 2.
Figure 8:
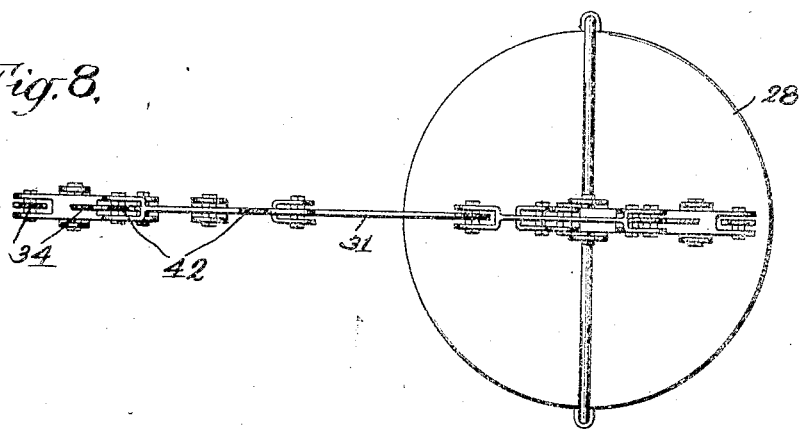
Fig. 8 is a detail sectional view of the parts shown in Fig. 2 taken on line 8—8 of that figure.

Referring now to Fig. 2 means is provided for selecting combinations of pivot points to produce different leverage ratios in the complete system. In Fig. 2 the levers 35, 37, 39, 41, 35$^a$, etc., all have fixed fulcrum pivots which are suitably supported in bearings carried by frames 48 and 49. The steelyard 27 is pivotally connected to a loop frame 50 which is best shown in Fig. 3 and is provided with a number of stirrups 51 carrying agate or other suitable bearings 52 to cooperate with the pivot points of the different levers. In varying the lever ratios the levers are selectively rocked so as to swing their pivots into or out of cooperation with the agates 52. Taking lever 35 as an illustration the rocking is effected by a spring retracted pivoted member 53 which is provided with an upstanding arm 54 forming the armature of an electromagnet 55. Upon the energization of magnet 55 the member 53 is rocked in a clockwise direction and inasmuch as the end of the lever 35 rests upon it the lever 35 will be swung in a counterclockwise direction thereby lifting pivot 36 from its point of cooperation with agate 52. When the lever is thus removed from cooperation with the agate, compensation must be effected for the dead weight of the lever. For this purpose a double arm lever 35$^b$ is provided which is suitably fulcrumed upon the supporting frame and provided with a dummy pivot 36$^b$ which is adapted to swing down into contact with agate 52 or out of contact therewith upon the rocking of member 53. The relation of the supplementary and main lever is best shown in Fig. 5 wherein lever 35$^a$ is illustrated carrying a pivot 43 and wherein supplementary lever 35$^c$ is shown as carrying a dummy pivot 43$^c$. From this figure it will be clear that when pivot 43 is in contact with the agate 52 the pivot 43$^c$ will be out of contact therewith and when pivot 43$^c$ is in contact with the agate the pivot 43 will be out of contact therewith. It will be understood that there is one rocking support 53 for each lever and supplementary lever and that there are individual magnets 55, 56, 57, 58, 59, 60, 61, 62 for the different levers. By selectively energizing these magnets 55 to 62 inclusive various combinations of levers can be brought into cooperation with the agates carried by the frame 50.

The selecting mechanism for the magnets 55 to 62 will now be described. Referring to Figs. 10 and 11, the key series 63 is the tens series and the key series 64 is the units series. These keys are suitably pivoted and have shouldered projections 65 which are variously arranged as shown in Fig. 11, to engage factored combinations of rocking levers 66. These rock levers, when depressed by the projection 65, actuate and close contacts 67, thereby establishing circuits for the selecting magnets. For simplicity in explanation, the magnets 55 to 62 inclusive have been labeled each with the price value of the ratio which each establishes in the lever system. For example magnet 55 establishes a ratio of one unit, and this magnet alone will remain deenergized when a one cent per unit of weight quantity is to be indicated. Magnet 60, on the other hand, represents a ratio of 20, and this magnet alone will remain deenergized when the quantity 20 is to be multiplied.

In Fig. 11 the rocking levers are similarly numbered. It will be understood also that the rocking levers here shown are for the tens magnets to left of Fig. 10, and that a similar series of rocking levers 68 is provided which cooperate with a set of contacts 69 to control the units magnets.

As an illustration of the operation of the machine, suppose it be desired to indicate a product based upon a price of 34 cents per pound. The upper key of the 63 series marked 4 would be depressed, and the lower key of the 64 series marked 3 would be depressed and held down. Referring to Fig. 11, depression of the key marked 4 would cause all of the units magnets with the exception of number 58 to be energized. Consequently levers 35$^a$, 37$^a$, and 39$^a$ would all be swung into ineffective position, and lever 41$^a$ would alone cooperate with the steelyard bearing. This would transmit such force that 4 would be indicated by the indicating devices of the load offsetting machine, as shown in Fig. 1. The depression of the 3 key in the tens series would, as shown in Fig. 11, leave magnets 59 and 60 deenergized. These magnets when deenergized would cause force reactions of 10 and 20 units, respectively, to be transmited to the steelyard 27. The summation of these 10 and 20 units would give a total of 30, and this quantity, added to the 4, would give the total of 34, which would be indicated upon the wheels 27$^a$ of Fig. 1.

By the arrangement herein described, it is possible to indicate all prices per unit of weight from 1 cent to 99 cents per unit. It will be understood further that the invention may be extended to include further quantities by providing suitable extra selecting devices, magnets, and lever devices.

The arrangement and number of levers is shown in its preferred form in Fig. 2. It will be understood however that this arrangement may be widely varied to meet the demands which will arise in practise, and that the selected combination and lever ratios as illustrated only set forth one embodiment of the invention.

By the use of the ratio mechanism and factoring devices heretofore described, the difficulties heretofore encountered with longitudinally shiftable pivots are obviated. The swinging of the pivot point of the lever directly down upon the bearing agate is found to introduce no error in the leverage system. Furthermore the ratio device is not subject to wear when in use, since the entire assemblage of parts, when weighing loads, are static and not subject to variable displacement under varying loads.

In the foregoing explanation has been given as to the means for directly indicating the total price upon the numeral wheels $27^a$ when one unit of weight is applied to the load support. It will be readily appreciated that the total price will similarly indicate when more than one unit of weight is applied to the load support. Irrespective of the amount of weight applied the selected factored combination of lever ratios will introduce a multiplying ratio between the load offsetting devices and the load support which corresponds to the selected numbers per unit of weight. Therefore the display result upon the numeral wheels $27^a$ will always be the total price or the price per unit of weight multiplied by the applied load.

While the invention has particular utility in connection with price scales its use is not limited to such devices. For example, it may well be used with counting scales and like machines where variable ratios are desired intermediate the load support and the numeral displaying means.

Heretofore in the specification and hereafter in the claims I will refer to the term displaying means for the result. Such displaying means need not necessarily be a visual indicator but may equally be a type member which is set to display the amount of the computation and in which the actual and final reading is taken by the printing operation.

What I claim is—

1. In a weighing scale, in combination, a variable ratio mechanism, comprising a lever system having a plurality of levers therein and means for rendering certain levers in said system inactive and others active, whereby the said levers by combinations of their effective multiples produce a plurality of ratios in said mechanism said ratios in number being greater than the number of levers employed.

2. In a weighing scale, in combination, a member supporting a plurality of bearings, a lever system including a plurality of separate levers adapted to individually cooperate with the said bearings, each of said levers having a predetermined multiplying ratio, means for rendering the levers of said system active or inactive, and selecting means for the aforesaid means.

3. A variable ratio mechanism for a weighing scale including in combination, a common load support and a common instrument between which support and instrument various leverage ratios are desired, a plurality of levers of varying but individually fixed multiples, and means for selecting factored combinations of said levers for conjoint operation to thereby secure various multiplying ratios.

4. A variable ratio mechanism for a weighing scale comprising a common load support and a common instrument between which support and instrument various leverage ratios are desired, a plurality of levers of varying multiple, a common member with which said levers cooperate, a plurality of magnets for selecting the levers for cooperation with said member, and a plurality of keys for controlling said magnets.

5. A weighing scale adapted to directly display products of weight and another factor comprising in combination, a variable ratio device adapted to be set in accordance with the said factor, a plurality of levers of varying multiple in said device, and key-controlled means for selecting the proper factored combination of levers for conjoint operation to thereby secure the proper ratio corresponding to any factor.

6. A weighing scale adapted to directly display products of weight and another quantity comprising a variable ratio mechanism, a plurality of levers of varying multiples, and selecting devices for introducing into cooperative action various factored combinations of said levers to thereby secure a plurality of ratios greater in number than the number of said levers.

7. In a scale of the type described, a main scale beam, load offsetting devices therefor with provisions for applying factored combinations of weights thereto to offset the applied load, a load support, a variable ratio leverage mechanism intermediate the load support and the scale beam, means for factoring the leverage ratio combinations of said mechanism to give various ratios corresponding to price per unit of weight, and means controlled by the load offsetting devices for numerically displaying the resulting product controlled by the load offsetting device.

8. In a scale, a main beam, a load support, a variable ratio leverage mechanism therebetween, a load offsetting and numerical result displaying means associated with the main beam, and means for factoring the combinations of lever ratios in said variable ratio mechanism for setting the same corresponding to various prices per unit of weight.

9. In a scale, in combination, a main beam, a load support, a multiple lever mechanism therebetween provided with multiple pivot devices, said pivot devices being fixed relative to the lever fulcrum pivots and shiftable relative to the cooperating bearings, and selecting devices for putting into cooperation with the bearings selected factored combinations of pivot devices for the purpose described.

10. In a weighing scale, in combination, with a load offsetting means including a numeral displaying means positioned thereby, a load support, variable ratio devices intermediate the load support and the load offsetting means, means for factoring the ratios of said devices whereby a plurality of ratios can be obtained therein.

11. In a weighing scale, in combination, a load support, a load offsetting means, a multiple lever ratio mechanism intermediate the load support and said load offsetting devices, and means for selecting factored combinations of said levers to produce varying multiplication ratios intermediate the load support and the load offsetting means.

12. In a weighing scale having a load support and load offsetting means, in combination, a variable ratio device intermediate the load support and load offsetting means, said device including a plurality of pivot devices which are selectively shiftable into or out of cooperation with their bearings, and means for selecting various combinations of said pivots for the purpose described.

13. A variable ratio device for a weighing scale comprising a plurality of levers of variable ratios, a pivot upon each of said levers, a member carrying bearings for said pivots, and means for rocking the said levers selectively and bringing certain pivots into cooperation with their bearing, and other pivots out of cooperation therewith.

14. In a weighing scale adapted to directly display total price of articles weighed, in combination, a load offsetting mechanism, a result indicating mechanism, a load support, a multiple leverage system intermediate the said load support and load offsetting mechanism, and means for selecting factored combinations of said levers for conjoint operation in accordance with the rate or price per unit of weight of the article whereby the indicating devices will directly display the total price of the article weighed.

15. In a weighing scale adapted to directly display the total prices of articles weighed, in combination, a load offsetting and result displaying means, a load support, a multiple lever system associated therewith and means for calling into action and into cooperation with the load offsetting mechanism factored combinations of said levers for conjoint operation to thereby secure variable ratios in said lever system in accordance with varying prices per units of weight of the articles weighed.

16. In a weighing scale adapted to directly display the total price of articles weighed, in combination, load offsetting means, result displaying means and load support and lever system comprising a plurality of levers of different multiples disposed between the load offsetting means and the load support, and a series of price keys for calling into conjoint operation factored combinations of said levers to thereby provide multiplication in said lever system in accordance with the value of the price keys which will operate.

17. In a weighing scale adapted to directly display the total price of articles weighed, in combination, load offsetting means, result displaying means, a load support, a lever system connecting the load offsetting means and the load support, said system including a plurality of levers of various multiples, magnet devices for calling into conjoint operation factored combinations of said levers and a series of price keys for calling into action factored combinations of said magnets in accordance with the desired price.

18. A scale adapted for counting, price computing or the like comprising, numerical result displaying means, a load support and load offsetting means for the applied load, multiple variable ratio mechanism intermediate the load support and load offsetting means, key-controlled means for selecting factored combinations of leverage ratios in said mechanism for the purpose described.

19. A scale adapted for counting, price computing or the like comprising, in combination with a load support, load offsetting means, numerical result displaying means controlled by the load offsetting means, variable ratio devices intermediate the load offsetting means and the load support, and key-controlled means for selecting factored combinations of said ratios.

20. The invention set forth in claim 19 in which the key-controlled means comprise a plurality of key banks of varying denominational orders.

21. A scale adapted for counting price computing or the like, comprising numerical result displaying means, a load support and load offsetting means for the applied load, multiple variable ratio mechanism intermediate the load support and the load offsetting means, and manually manipulable devices for selecting factored combinations of leverage ratios in said mechanism for the purpose described.

22. A force measuring apparatus having provisions for multiplying an applied force by any of a plurality of factors and displaying as a numerical quantity the said product, said apparatus comprising in combination a plurality of levers operable selectively conjointly to give any one of a plurality of different leverage ratios, a plurality of other levers operable selectively conjointly to give any one of a plurality of other different leverage ratios, means for combining the ratios thus secured, and means for displaying a number representative of the combined ratio.

23. The invention set forth in claim 22 in which manipulative devices are provided with provisions for variously selecting factored combinations of the different levers which are to operate conjointly.

24. A multiple ratio mechanism comprising a group of rocking members selectively and conjointly operable, another group of rocking members selectively and conjointly operable, electro-magnetic means controlled by said rocking members, indicating means, and a multiple ratio device under the control of said electro-magnetic means for affecting said indicating means by an amount dependent on the combined result produced as a result of the operation of any one or plurality of said rocking levers.

25. A multiple ratio mechanism comprising a plurality of groups of devices, each group having a plurality of said devices selectively and conjointly operable, a multiple ratio device under the control of said devices, and a group of keys for controlling the operation of each group of devices whereby said multiple ratio device is controlled.

26. A multiple ratio mechanism comprising a plurality of groups of rocking members, each group having a plurality of rocking members selectively and conjointly operable, a multiple ratio device comprising a plurality of levers and having provisions for severally and conjointly rendering said levers effective, and a group of keys for controlling the operation of each group of rocking members whereby said multiple ratio device is controlled.

27. In an apparatus of the class described, the combination comprising, load offsetting mechanism, load supporting mechanism, multiple ratio mechanism intermediate said load offsetting mechanism and said load supporting mechanism, said multiple ratio mechanism comprising a member connected to said load offsetting mechanism, bearing members carried by said member, a plurality of levers, each lever being adapted to be associated with a corresponding bearing member, and linkage interconnecting the various levers with said load supporting mechanism.

28. The combination set forth in claim 27 in which means are provided for selectively associating or disassociating said levers with corresponding bearing members.

29. In an apparatus of the class described, the combination comprising, load offsetting mechanism, load supporting mechanism, a scale beam connected with said load offsetting mechanism, said scale beam having bearing members extending therefrom, a plurality of levers adapted to be brought into operative relation with said bearing members, and a plurality of links interconnecting said levers with said load supporting mechanism.

30. The combination set forth in claim 29 in which counter-weights are provided for counteracting the effect of the bearing engaging members when the bearing engaging members are removed from engaging relation with the bearing members, and manually controlled means for selectively engaging and disengaging bearing engaging members and bearing members.

In testimony whereof I hereto affix my signature.

JAMES W. BRYCE.